March 6, 1951  C. D. SAWNER  2,544,049
BAIT BOX

Filed July 29, 1948  2 Sheets-Sheet 1

Clifford D. Sawner
INVENTOR.

BY *Lawrence A. O'Brien*
*and Harvey B. Jacobson*
Attorneys

March 6, 1951            C. D. SAWNER            2,544,049
BAIT BOX
Filed July 29, 1948            2 Sheets-Sheet 2
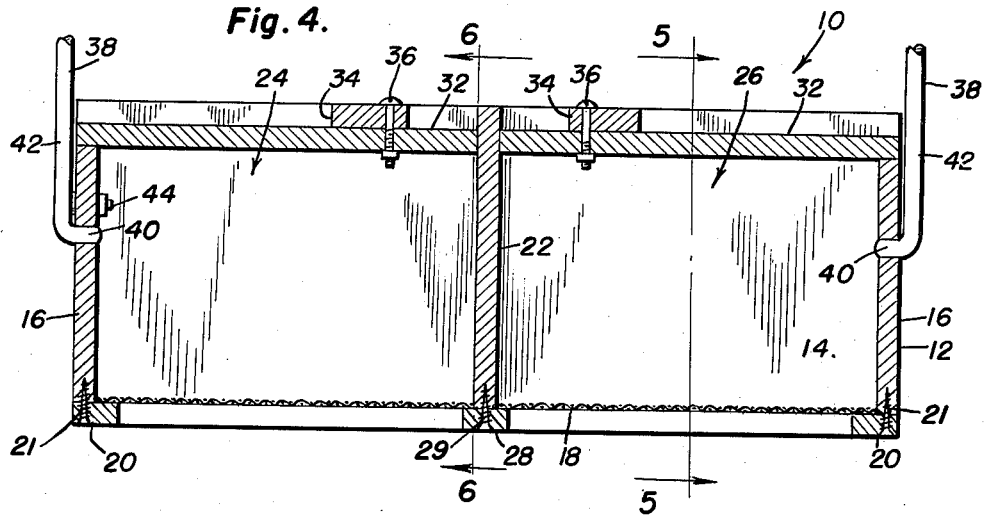
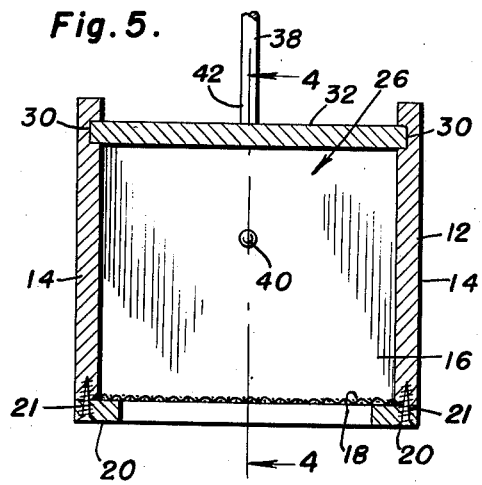
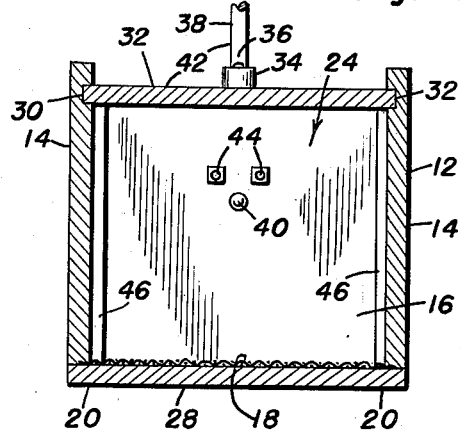
Clifford D. Sawner
INVENTOR.
BY *Clarence A. O'Brien*
*and Harvey B. Jacobson*
Attorneys Patented Mar. 6, 1951

2,544,049

UNITED STATES PATENT OFFICE 2,544,049

BAIT BOX

Clifford D. Sawner, Vernon Center, N. Y.

Application July 29, 1948, Serial No. 41,373

1 Claim. (Cl. 43—55)

This invention relates to new and useful improvements and structural refinements in bait boxes, and the principal object of the invention is to facilitate preserving of fish bait in proper condition over considerable periods of time.

This object is achieved by the provision of a bait box having a foraminous bottom, matters being so arranged that when the box, containing the bait together with moisture preserving leaves, moss, or the like, is lowered in water, the foraminous bottom of the box will permit water to be absorbed in the leaves, moss, or the like, whereby after the box is removed from water, the moist leaves, moss, or the like, will preserve the bait in proper condition over considerable periods of time.

An important feature of the invention resides in the provision of slidable covers on the box, together with a carrying handle which, in addition to its normal function, also acts as means for preventing opening of the covers while the box is being carried, thus safeguarding against the possibility of the covers coming open and the bait escaping while the box is being carried.

An additional feature of the invention resides in the provision of releasable means for retaining the carrying handle in an upright position, thereby automatically preventing the covers of the box from being opened until the carrying handle is swung to one side or the other.

An important advantage of the invention resides in its simplicity of construction, convenient portability, and in its adaptability to economical manufacture.

With the more important objects and features in view and such other objects and features as may become apparent as this specification proceeds, the invention consists essentially of the arrangement and construction of parts as illustrated in the accompanying drawings, in which:

Figure 4 is a longitudinal cross sectional view of the subject shown in Figure 1, the same being taken substantially on the plane of the line 4—4 in Figure 5;

Figure 5 is a cross sectional view, taken substantially on the plane of the line 5—5 in Figure 4; and Figure 6 is a cross sectional view, taken substantially on the plane of the line 6—6 in Figure 4, with the partitions of the receptable removed for purposes of illustration.

Like characters of reference are employed to designate like characters in the specification and throughout the several views.

Figure 1:
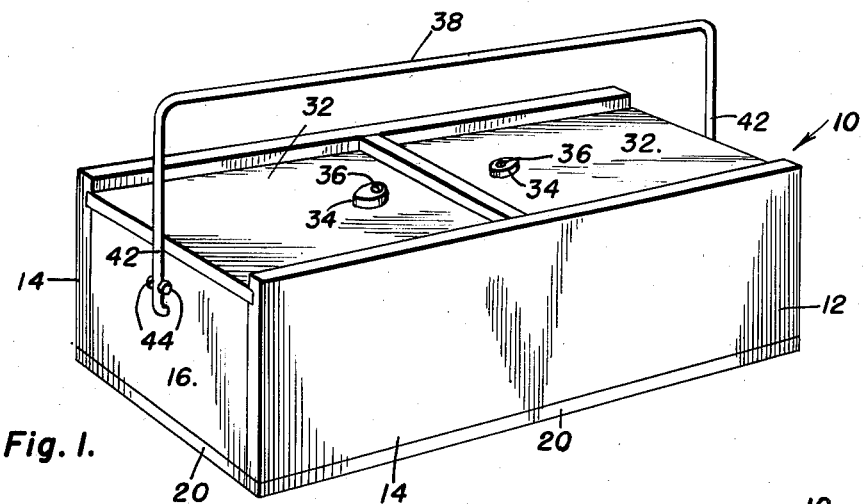
Figure 1 is a perspective view of the invention in a closed position.

Referring now to the accompanying drawings in detail, the invention consists of a bait box designated generally by the reference character 10, the same embodying in its construction an elongated receptacle 12 including a pair of side walls 14, a pair of end walls 16 and a foraminous bottom 18, assuming the form of a screen or the like.

The screen 18 is removably retained in position by perimetrically extending cleats or strips 20 suitably secured to the lower edges of the receptacle walls 14, 16, by screws 21, or the like, this arrangement permitting the screen to be removed for purposes of cleaning, replacement, or the like, as will be clearly understood.

A transversely extending partition 22 separates the receptacle 12 into a pair of compartments 24, 26, and although only two of these compartments are shown in the accompanying drawings, it should be understood that additional partitions may be provided to form additional compartments, if so desired.

In addition to the strips or cleats 20, a transversely extending cleat or strip 28 may be removably secured to the lower edge of the partition 22 by screws 29, or the like, for assisting to retain the screen 18 in position, substantially as shown.

The upper edge portions of the side walls 14 of the receptacle 12 are formed with longitudinally extending grooves 30 constituting guides for outwardly slidable covers 32, these covers, when closed, abutting against the partition 22, as shown in Figures 1 and 4. However, it is to be noted that the covers 32 are provided adjacent their inner ends with suitable knobs 34 which are secured to the upper surfaces of the covers by suitable screws 36, the shanks of the latter protruding into the compartments 24, 26, so that when the covers are slid outwardly to a position shown in Figure 2, the shanks of the screws 36 will engage the inner surfaces of the end walls 16, thereby preventing the covers 32 from becoming separated from the receptacle. Needless to say, the knobs 34 are employed for sliding the covers 32, as will be clearly understood.

Figure 2:
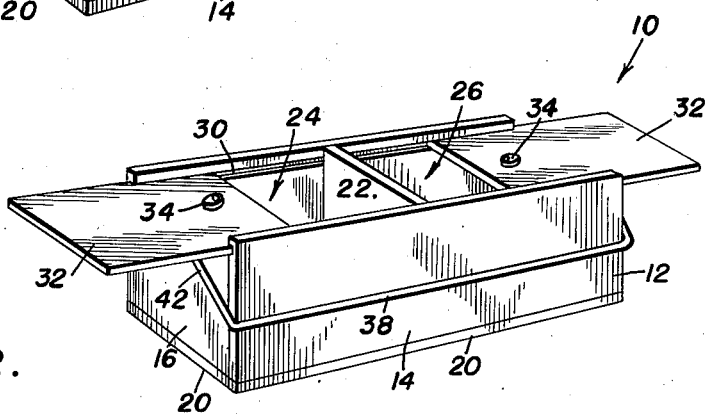
Figure 2 is a perspective view thereof in an open position.
Figure 3:
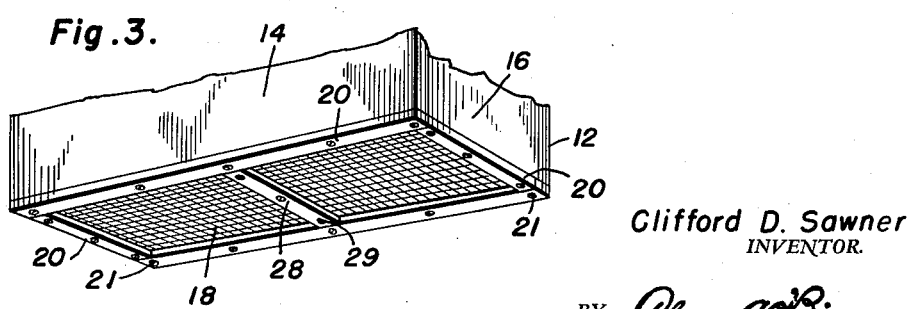
Figure 3 is a fragmentary underside perspective view of the subject shown in Figures 1 and 2.

The receptacle 12 is provided with a substantially U-shaped carrying handle 38, the free end portions of which are inwardly angulated as at 40 and are rotatably engaged with suitable apertures formed in the end walls 16, whereby the handle 38 may be swung from a substantially vertical position to one side or the other, as shown in Figure 2.

It is to be noted, however, that when the handle 38 is in a carrying position, that is, in a substantially vertical position as shown in Figures 1 and 4, the side portions 42 of the handle are engageable by outer edges of the covers 32, whereby the covers are prevented from being slid outwardly to an open position, until such time as the handle 38 is swung to one side of the receptacle or the other. In this manner, accidental or unintentional opening of the covers will be prevented, and the possibility of the bait escaping from the compartments 24, 26 will be substantially eliminated.

Means are provided for releasably retaining the handle 38 in its substantially vertical, carrying position, these means including a pair of bolts 44 mounted in one of the end walls 16 at the relatively opposite sides of the adjacent handle portion 42, the bolts 44 normally preventing the handle from swinging from one side or the other of the receptacle 12, but it being understood that the handle possesses sufficient inherent resiliency so as to facilitate passage thereof over the heads of the bolts 44 when the handle is intentionally swung in a lateral direction.

When the invention is placed in use, leaves, moss, or the like, may be placed in the compartments 24, 26 of the receptacle together with the bait, and the bait box, as a whole, may be lowered into water, so that the water, entering the compartments 24, 26 through the foraminous bottom 18, will become absorbed by the leaves or moss. Accordingly, after the bait box is removed from water, the leaves or moss will retain sufficient moisture to preserve the bait in proper condition for considerable periods of time, and it may be also added that excess water will be drained from the receptacle through the foraminous bottom upon removal of the bait box from water, thus preventing the bait from being drowned.

Finally, by way of further explanation it may be stated that the side walls 14 of the receptacle 12 are formed at the inner surfaces thereof with opposed, vertical channels or grooves 46 to accommodate the aforementioned partition 22, as is best shown in Figure 6.

It is believed that the advantages in use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

A bait box comprising a receptacle having a foraminous bottom and provided with a plurality of juxtaposed compartments, a pair of outwardly slidable covers on said receptacle, and a substantially U-shaped carrying handle having end portions thereof swingably attached to said receptacle adjacent outer edges of said covers, said outer edges being engageable with the adjacent portions of said handle in a carrying position and said handle preventing outward sliding of said covers.

CLIFFORD D. SAWNER.

REFERENCES CITED

The following references are of record in the file of this patent:

UNITED STATES PATENTS

| Number | Name | Date |
|---|---|---|
| 598,801 | Minter | Feb. 8, 1898 |
| 665,859 | Allen | Jan. 15, 1901 |
| 1,046,642 | Potts | Dec. 10, 1912 |
| 1,219,402 | Rutan | Mar. 13, 1917 |
| 2,001,468 | Moutoux | May 14, 1935 |
| 2,087,413 | Ohme | July 20, 1937 |